(12) United States Patent
LaCross (10) Patent No.: US 11,708,035 B2
(45) Date of Patent: Jul. 25, 2023

(54) VEHICULAR IMAGING SYSTEM WITH EXTENDABLE CAMERA

(71) Applicant: Magna Mirrors of America, Inc., Holland, MI (US)

(72) Inventor: Anthony J. LaCross, Hastings, MI (US)

(*) Notice: Subject to any disclaimer, the term of this patent is extended or adjusted under 35 U.S.C. 154(b) by 0 days.

(21) Appl. No.: 17/443,957

(22) Filed: Jul. 29, 2021

(65) Prior Publication Data

US 2022/0032858 A1    Feb. 3, 2022

Related U.S. Application Data

(60) Provisional application No. 62/706,084, filed on Jul. 31, 2020.

(51) Int. Cl.
| | | |
|---|---|---|
| *B60R 11/04* | (2006.01) | |
| *B60R 1/04* | (2006.01) | |
| *H04N 23/57* | (2023.01) | |
| *B60R 1/12* | (2006.01) | |

(52) U.S. Cl.
CPC ............ *B60R 11/04* (2013.01); *B60R 1/04* (2013.01); *H04N 23/57* (2023.01); *B60R 2001/1215* (2013.01); *B60R 2300/103* (2013.01); *B60R 2300/105* (2013.01)

(58) Field of Classification Search
USPC .......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,796,094 A | 8/1998 | Schofield et al. |
| 6,097,023 A | 8/2000 | Schofield et al. |
| 7,777,611 B2 | 8/2010 | Desai |
| 7,965,336 B2 | 6/2011 | Bingle et al. |
| 9,041,806 B2 | 5/2015 | Baur et al. |
| 9,126,525 B2 | 9/2015 | Lynam et al. |

(Continued)

FOREIGN PATENT DOCUMENTS

| | | | | |
|---|---|---|---|---|
| CN | 102712287 B | * | 4/2015 | ............ B60R 11/04 |
| CN | 110562142 A |   | 12/2019 | |

(Continued)

*Primary Examiner* — Behrooz M Senfi
(74) *Attorney, Agent, or Firm* — Honigman LLP (57) ABSTRACT

A vehicular imaging system includes an electronic control unit (ECU) and a camera device disposed at a body portion of the vehicle. The camera device includes structure that supports a camera and that is movable between a stowed position, where the structure and camera are within the body portion, and an extended position, where the structure and camera are extended outward from the body portion so that the camera is positioned with a field of view exterior of the vehicle. The structure includes a plurality of individually movable elements that are disposed adjacent one another and that cooperate to form the outer surface. The individually movable elements, when moved relative to the body portion of the vehicle, cooperate to extend and retract the camera. The camera, when the structure is in the extended position, captures image data and provides captured image data to the ECU.

24 Claims, 4 Drawing Sheets

(56) References Cited

U.S. PATENT DOCUMENTS

| | | |
|---|---|---|
| 9,762,880 B2 | 9/2017 | Pflug |
| 9,900,522 B2 | 2/2018 | Lu |
| 10,046,706 B2 | 8/2018 | Larson et al. |
| 10,071,687 B2 | 9/2018 | Ihlenburg et al. |
| 10,166,924 B2 | 1/2019 | Baur |
| 10,421,404 B2 | 9/2019 | Larson et al. |
| 10,442,360 B2 | 10/2019 | LaCross et al. |
| 2012/0162427 A1 | 6/2012 | Lynam |
| 2014/0285666 A1 | 9/2014 | O'Connell et al. |
| 2015/0022664 A1 | 1/2015 | Pflug et al. |
| 2015/0097953 A1* | 4/2015 | Stambaugh ............ B60R 11/04 348/148 |
| 2015/0183380 A1* | 7/2015 | Da Deppo ............. B60R 11/04 348/148 |
| 2015/0304612 A1* | 10/2015 | Richards ............... H04N 7/188 348/159 |
| 2016/0096486 A1* | 4/2016 | Dziurda .................. B60S 1/54 348/375 |
| 2017/0104907 A1* | 4/2017 | Rajhansa ........... H04N 5/23254 |
| 2017/0355312 A1 | 12/2017 | Habibi et al. |
| 2018/0134217 A1 | 5/2018 | Peterson et al. |
| 2019/0047475 A1 | 2/2019 | Uken et al. |
| 2019/0118717 A1 | 4/2019 | Blank et al. |
| 2019/0146297 A1 | 5/2019 | Lynam et al. |
| 2019/0258131 A9 | 8/2019 | Lynam et al. |
| 2020/0025596 A1 | 1/2020 | Parsons |
| 2020/0238910 A1* | 7/2020 | Wilson ............... H04N 5/23299 |
| 2020/0298762 A1* | 9/2020 | Ichimura .................. B60R 1/12 |
| 2020/0377022 A1 | 12/2020 | LaCross et al. |
| 2020/0398767 A1 | 12/2020 | Park et al. |
| 2021/0094473 A1 | 4/2021 | Gali et al. |
| 2021/0155167 A1 | 5/2021 | Lynam et al. |
| 2021/0162926 A1 | 6/2021 | Lu |
| 2021/0245662 A1 | 8/2021 | Blank et al. |
| 2021/0323473 A1 | 10/2021 | Peterson et al. |
| 2022/0258670 A1* | 8/2022 | Hanchett .................... B60R 1/12 |

FOREIGN PATENT DOCUMENTS

| | | | | |
|---|---|---|---|---|
| EP | 3043202 A1 | * | 7/2016 | ............ B60R 11/04 |
| KR | 20180056674 A | * | 5/2018 | ............ B60R 11/04 |
| WO | WO-2018094163 A1 | * | 5/2018 | ............ B60R 11/04 |
| WO | 2021263280 A1 | | 12/2021 | |

* cited by examiner

VEHICULAR IMAGING SYSTEM WITH EXTENDABLE CAMERA

CROSS REFERENCE TO RELATED APPLICATION

The present application claims the filing benefits of U.S. provisional application Ser. No. 62/706,084, filed Jul. 31, 2020, which is hereby incorporated herein by reference in its entirety.

FIELD OF THE INVENTION

The present invention relates to vehicular vision systems that display video images derived from image data captured by one or more cameras of the vehicle.

BACKGROUND OF THE INVENTION

It is known to provide a video display at the exterior rearview mirror assembly, such as described in U.S. Pat. No. 7,777,611, which is hereby incorporated herein by reference in its entirety, or to provide a video display at an interior rearview mirror assembly to display sideward and/or rearward images captured by exterior viewing cameras, such as described in U.S. Pat. No. 5,670,935, which is hereby incorporated herein by reference in its entirety.

SUMMARY OF THE INVENTION

The present invention provides a vehicular vision system that captures image data sideward and rearward of an equipped vehicle via side-mounted cameras at the sides of the vehicle, such as for object detection and/or for display of video images for viewing by the driver of the vehicle while driving the vehicle. For example, the cameras may be part of a camera monitoring system (CMS) of the vehicle. The cameras are housed or supported or accommodated at camera devices that are extendable and retractable relative to the side of the vehicle, such that the camera devices, when retracted, are within the side of the vehicle with the exterior surface of the camera device being generally flush or coplanar with the exterior surface of the side of the vehicle. When extended, the camera device positions the camera at a location spaced from the side of the vehicle for providing an enhanced view along the side of and rearward of the vehicle. The camera device comprises a housing structure that includes a plurality of individually movable elements that are disposed adjacent one another and that cooperate to form the outer surface. The individually movable elements, when moved relative to the body portion of the vehicle, cooperate to extend and retract the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and to provide an output to one or more display devices for displaying video images representative of the captured image data. For example, the vision system may provide a rearview display (such as derived from image data captured by one or more rearward viewing cameras at the vehicle) or a top down or bird's eye or surround view display or the like.

Figure 1:
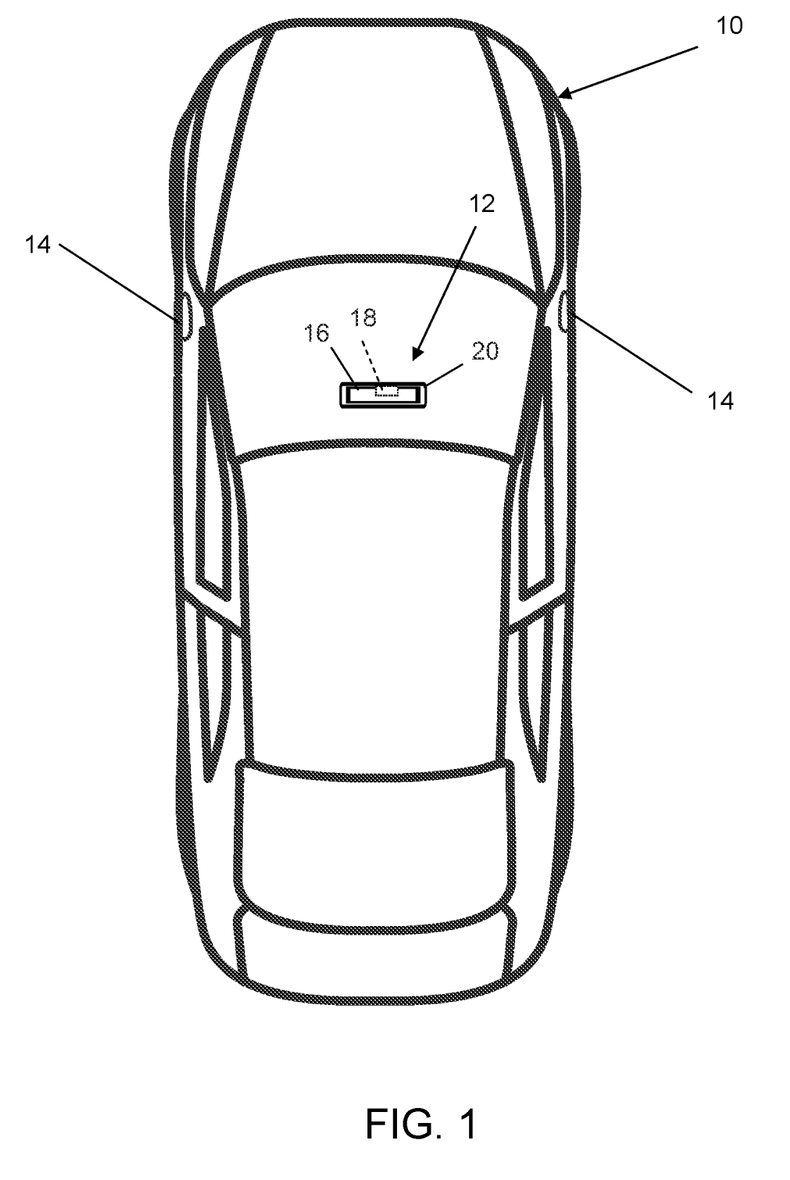
FIG. 1 is a plan view of a vehicle having a vision system and side-mounted camera devices in accordance with the present invention.

Referring now to the drawings and the illustrative embodiments depicted therein, a vehicle 10 includes an imaging system or vision system 12 that includes multiple exterior viewing cameras, including side-mounted extendable/retractable camera devices or modules 14 at each side of the vehicle (FIG. 1). The system may also include other cameras, such as surround view cameras (including a rearward viewing or rear backup camera, a forward viewing camera at the front of the vehicle and side surround view cameras at respective sides of the vehicle). The side-mounted camera modules 14 may be part of a camera monitoring system (CMS), which may provide a rearward viewing camera that has a different field of view than the rear backup camera, with the camera 15 (when the module is extended) capturing image data of the respective scene exterior of the vehicle and in the field of view of the respective camera, with each camera having a lens for focusing images at or onto an imaging array or imaging plane or imager of the camera. The system may display video images derived from image data captured by the cameras at a video display screen in the vehicle for viewing by the driver of the vehicle while the driver is operating the vehicle.

The vision system 12 includes a control or electronic control unit (ECU) 18 having electronic circuitry and associated software, with the electronic circuitry including a data processor or image processor that is operable to process image data captured by the cameras, whereby the ECU may detect or determine presence of objects or the like and/or the system may provide video images to a display device 16 of the interior rearview mirror assembly 20 of the vehicle for viewing by the driver of the vehicle and/or to a display device at the center console or stack of the vehicle (and optionally to CMS displays at or near the driver and passenger side A-pillars of the vehicle, such as described in U.S. Publication Nos. US-2018-0134217 and/or US-2014-

0285666, which are hereby incorporated herein by reference in their entireties). The data transfer or signal communication from the cameras to the ECU may comprise any suitable data or communication link, such as a vehicle network bus or CAN (Controller Area Network) bus or LIN (Local Interconnect Network) bus or I2C bus or the like of the equipped vehicle. The camera device may utilize aspects of the camera devices described in PCT Application No. PCT/US21/70765, filed Jun. 24, 2021, which is hereby incorporated herein by reference in its entirety.

The rearward viewing cameras of the CMS cameras may function to provide rearward video images for a dual-mode interior rearview video mirror that can switch from a traditional reflection mode to a panoramic live-video display mode. The system and cameras and display device may utilize aspects of the systems described in U.S. Pat. Nos. 10,442,360; 10,421,404; 10,166,924 and/or 10,046,706, and/or U.S. Publication Nos. US-2021-0162926; US-2021-0155167; US-2021-0094473; US-2020-0377022; US-2019-0258131; US-2019-0146297; US-2019-0118717; US-2019-0047475 and/or US-2017-0355312, and/or U.S. patent application Ser. No. 17/301,853, filed Apr. 16, 2021, now U.S. Pat. No. 11,465,561, and/or Ser. No. 17/248,736, filed Feb. 5, 2021, now U.S. Pat. No. 11,242,008, which are all hereby incorporated herein by reference in their entireties.

Figure 2:
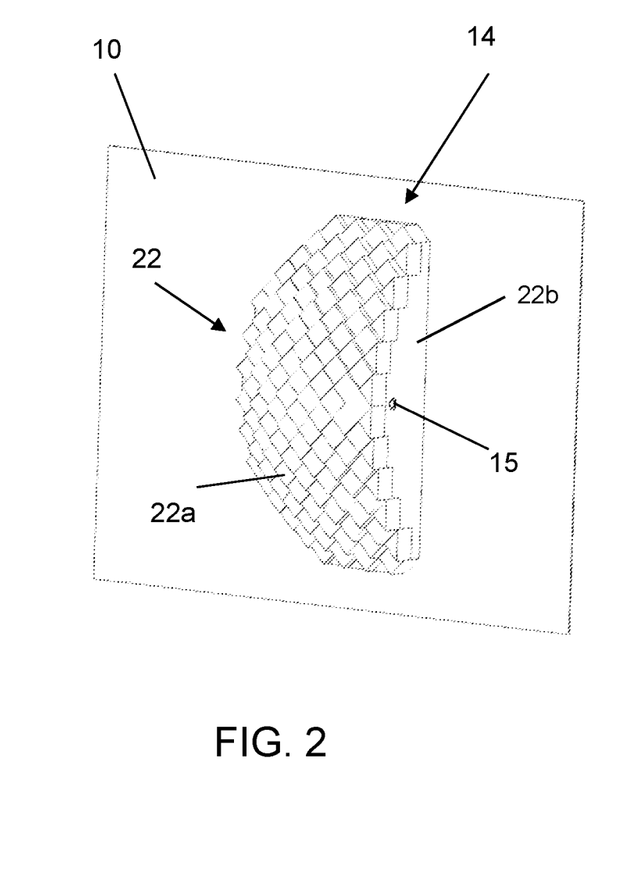
FIG. 2 is a perspective view of the camera device, shown in its extended state.
Figure 3:
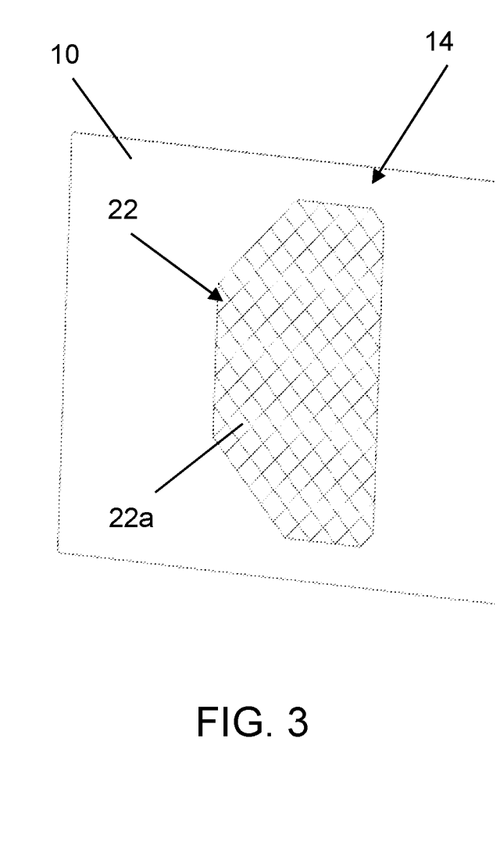
FIG. 3 is a perspective view of the camera device, shown in its retracted state.
Figure 5A:
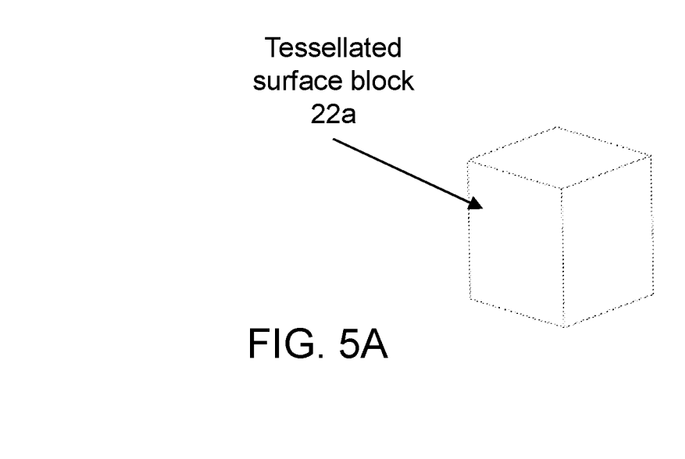
FIGS. 5A and 5B are perspective views of individually movable blocks of the housing structure of the camera device.
Figure 5B:
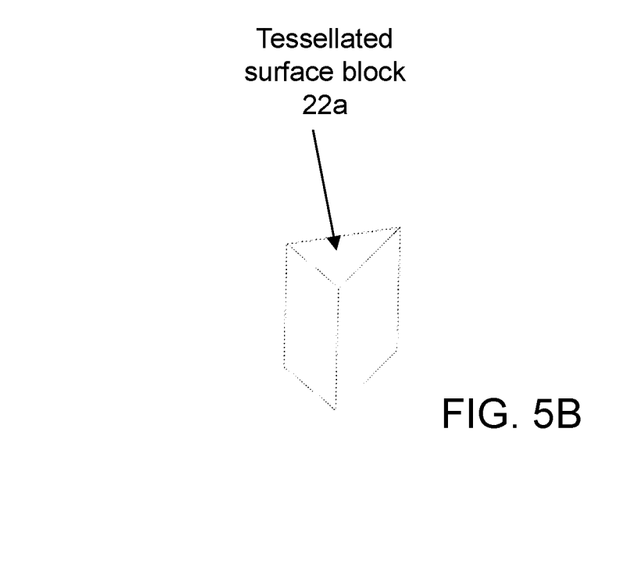
Figure 6:
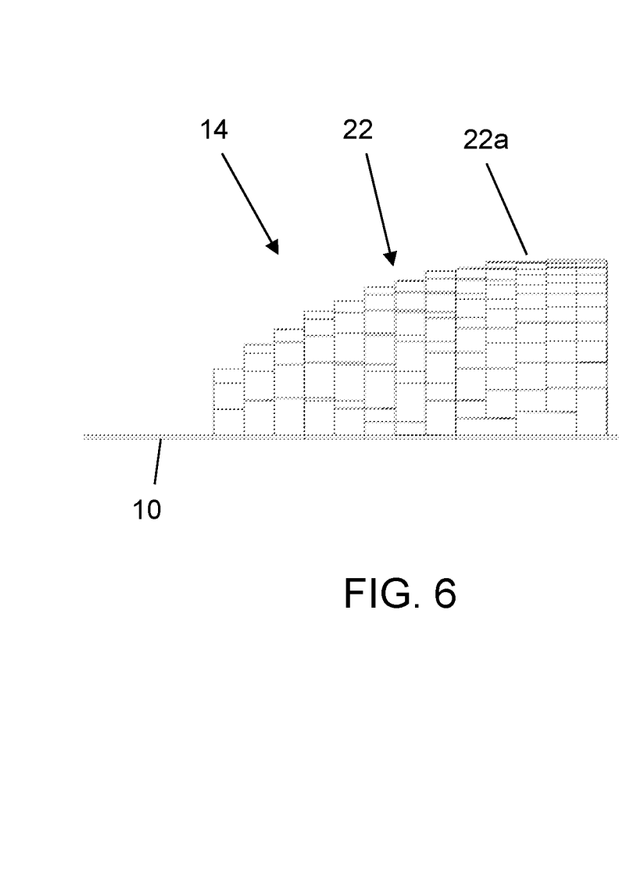
FIG. 6 is a top plan view of the camera device.
Figure 7:
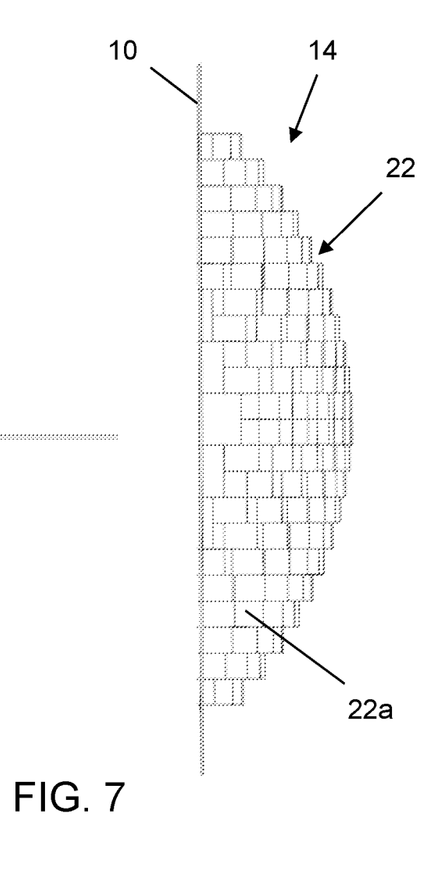
FIG. 7 is a view of the camera device from forward of the camera device.
Figure 8:
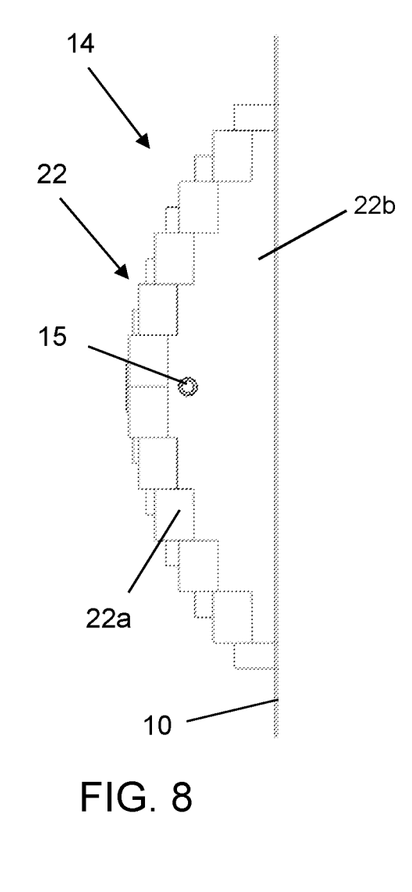
FIG. 8 is a view of the camera device from rearward of the camera device.

As shown in FIGS. 2 and 3, the camera device 14 comprises a housing structure 22 that supports or houses the camera 15 and that expands and contracts to move the camera 15 relative to the side of the vehicle between its extended position (FIG. 2) and its retracted position (FIG. 3). The camera housing structure 22 comprises a tessellated surface or mosaic surface made up of multiple individual elements or blocks 22a, such as cubes (FIG. 5A) (having square faces) and pyramids or prisms or triangle prisms (FIG. 5B) (having triangular faces), or any suitable shapes, such as, for example, three-dimensional shapes having hexagon-shaped faces, pentagon-shaped faces, rhombus-shaped faces, etc. The multiple individual elements move relative to one another during extension and retraction of the camera. As shown in FIG. 2, the housing structure 22 of the camera device is flush with an outer surface of the vehicle 10 when in its retracted position and not in use and, when needed or in use, the housing structure 22 of the camera device is extended outward from the outer surface of the vehicle 10 to its extended position (FIG. 3) using the tessellated surface made up of squares and triangles (and/or other shapes). The housing structure can "flow" into shape like a liquid and is not required to be fixed to any one specific shape.

Figure 4:
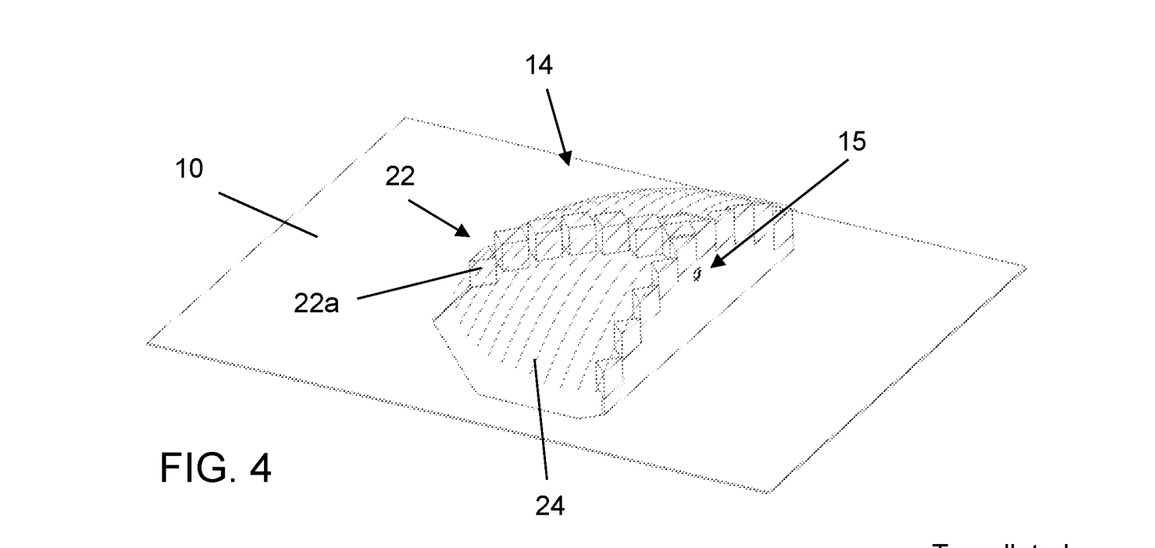
FIG. 4 is another perspective view of the camera device, shown with some of the individually movable blocks or elements removed.

As can be seen with reference to FIG. 4, the housing structure 22 is made up of many individual blocks or elements 22a that all work together to create the final shape. Each block is connected to one or more adjacent blocks adjacent to and/or around it, but each block is allowed to move normal to the body of the vehicle and relative to the other adjacent blocks so that the depth (or degree of extension relative to the side of the vehicle) of each block is variable. The blocks are relatively small blocks, such as having a cross dimension of less than 15 mm or less than 10 mm or less than 5 mm, with the size of the blocks selected to provide the desired smoothness of the curved structure when extended. The blocks may vary in size and shape to provide the desired matrix or array of blocks or elements for the particular vehicular application and to achieve the desired shape and appearance of the structure when the structure is extended.

In the illustrated embodiment, the blocks 22a are grouped into rows, with each row being controlled with a flexible surface control wire 24 that is fixed at one end, and allowed to be lengthened or shortened at the other. Thus, as the control wire 24 is lengthened from one end and fixed at the other end, the length of the control wire expands from, so as to bow or push the blocks 22a fixed to the respective control wire away from the retracted position. When the control wire is shortened, the length of the control wire contracts, so as to pull the wire taut and retract the blocks 22a toward the retracted position. The blocks or elements may have different shapes and sizes so that, when combined, the outer surfaces of the blocks or elements provide the desired curvature and shape and appearance, while allowing for retraction into the side of the vehicle to provide an outer surface that is generally flush with the side of the vehicle when the structure is retracted.

For example, an upper (or lower) end of each wire may be fixed at the camera device and relative to the vehicle, and the opposite or lower (or upper) end of each surface control wire may be pulled or pushed to cause the wire to straighten or bend to impart movement of the blocks toward or away from the side of the vehicle. Each surface control wire is controlled (pulled/pushed) by an individual actuator, or groups of wires may be controlled together via a respective individual actuator. For example, all of the wires may be controlled via one, two or three (or more) actuators. Optionally, the blocks may be biased toward an extended state and/or the wires may be biased toward a more-curved state, such that, when the wires are not pulled by the respective actuators, the wires and blocks are biased or urged toward the curved state and extended state. Then, when the respective actuators are operated, the wires are pulled taut toward a less or non-curved state and the housing structure becomes flush with the outer surface of the vehicle.

The individual blocks or elements are formed and arranged to provide a two dimensional array or matrix of elements that can move inward and outward relative to the side of the vehicle and relative to one another. The elements may comprise any suitable material, such as an injection molded plastic or such as metal. The elements may include structure at their side surfaces that maintain alignment of the elements relative to the adjacent elements while the elements move inward and outward relative to one another and relative to the side of the vehicle. The elements may include attaching structure at their inner face or surface for attaching the respective elements to the respective flexible wire or to other flexible element(s) for extending and retracting the elements and structure and camera. By controlling the movement and relative movement of the individual elements or blocks, the shape and degree of extension of the structure can be adjusted to provide the desired appearance and/or camera view when the structure is at least partially extended. The outer surfaces of the individual elements 22a cooperate to form an outer surface of the housing structure 22. Thus, the outer surfaces of the individual elements may be configured to provide a flat or otherwise flush or coplanar surface with the side of the vehicle when in the retracted position and the size of the individual elements may be configured to provide a substantially curved or smooth outer surface when in the extended position. Optionally, the individual elements may be configured to provide an angular outer surface when in the extended position. Optionally, a flexible outer material or shell or surface, such as a fabric or polymer, may be disposed across the outer surface of the housing structure so as to provide a seamless outer surface and further smooth the appearance of the housing structure when in the extended position.

The shape shifting ability of the camera device allows the exterior or A-surface of the camera device to change to provide the desired function or appearance. The structure may be changed based on several factors, including, for example, camera aim, camera function, desired aesthetics (such as an operator or driver desired appearance of the camera when at least partially extended) and/or aerodynamics. The camera aim can be changed dynamically to provide the driver with a desired or appropriate field of view. For example, the camera position may be adjusted to provide a rearward view along the side of the vehicle or to provide a more sideward view toward a blind spot region at the side of the vehicle, depending on the driving maneuver being undertaken by the driver of the vehicle. Also, the camera aim may be adjusted to tilt down to provide better view while reversing, and/or the camera may be extended out from the vehicle further while the vehicle is towing a trailer, and/or the camera position may be changed to assist the driver in parking the vehicle. It is envisioned that the device and structure may be adjustable relative to the side of the vehicle to change the camera aim, such as by pivoting or rotating the device about a laterally extending horizontal axis to move or pivot or swing the camera from a rearward viewing orientation to a downward viewing orientation (and optionally to move or pivot or swing the camera to a forward viewing orientation). The housing structure can extend/retract to position the camera at the desired location and may adjust the extension/retraction depending on whether the camera is viewing rearward or downward (or forward).

Thus, the camera is supported by the moving structure of the housing structure 22 with the lens or viewing aperture of the camera 15 disposed at an outermost surface of the structure 22*b* so that manipulation of the shape of the structure 22 via movement of the individual blocks 22*a* correlates to desired movement and/or pivoting of the camera 15 to provide the desired viewing angle. The camera support structure may comprise a panel that moves inward and outward with the blocks to position the camera at the appropriate or desired distance from the side of the vehicle. The camera may be mounted at the wall or structure via any suitable means, such as via snap attachment of the camera at a receiving structure of the wall or via threaded attachment of the camera at the receiving structure. When disposed at the receiving structure of the wall or structure of the camera device, the lens of the camera is at or generally flush with (or slightly proud of or recessed in) the wall structure with the lens principal axis directed generally rearward and/or sideward and/or downward relative to the vehicle at which the camera device is mounted. The wall or structure that supports the camera may have a conformable portion or region that conforms with the individual elements as they move to deploy or retract the camera, or the camera device may include a flexible or conformable seal or gasket or material disposed between the structure or wall and the individual elements to seal the camera device when it is extended. Optionally, the structure or wall that supports the camera may itself comprise a plurality of individual elements that move together with the other individual elements as the camera is deployed or retracted (with the camera, comprising a lens and an imager, disposed at one of the individual elements of the wall structure).

Optionally, some or all of the blocks or elements of the camera housing may be backlit or illuminated by one or more light sources (such as one or more light emitting diodes (LEDs)) of the camera device. For example, each block may be LED illuminated or backlit, and optionally the LEDs may operate to provide a driver customizable pattern and may vary in color and/or intensity/brightness of the light emitted by the respective LEDs. For example, the LEDs may provide a turn signal or running light function at the camera device.

Optionally, the individual blocks may be held together with a flexible fabric or other suitable material that is stretched over an internal structure of the blocks so as to provide the mechanism for extending/retracting the blocks. For example, the fabric may connect to each block and the blocks may be biased outward from the side of the vehicle (such as via spring elements or biasing elements at the individual blocks or groups of blocks), whereby, when the fabric is pulled taut, the blocks are retracted, and when the fabric is released the blocks are biased and urged outward to extend from the vehicle an amount based on the tightness of the fabric.

When the camera device is in the retracted state, the camera device is disposed inboard of the outer surface or panel of the vehicle body, and an outer surface of the blocks 22*a* of the housing 22 is generally flush with or co-planar with or corresponds with the outer surface of the vehicle body around the aperture or slot. The camera housing 22 (and the individual blocks) may seal against the panel of the vehicle body at the aperture to limit water intrusion and the like into the vehicle body portion. As shown in FIG. 2, when the camera device is in the extended state, the housing moves outward so as to be disposed outside of and outboard of the body panel, with the blocks sealing relative to adjacent blocks and the blocks along the sides and/or rear portion of the housing sealing at the panel of the side of the vehicle to limit water intrusion and the like into the vehicle body portion. The design of the housing structure provides a complete seal to outside environments throughout the entire range of shape shifting or extending/retracting of the camera between the fully extended position and the fully retracted position.

The camera device 14 is disposed at a side portion of the vehicle body, such as at a side door panel or at a panel forward of the front driver/passenger door, so as to capture image data representative of a view similar to that provided by a side-mounted exterior rearview mirror assembly. When the camera device 14 is extended, the camera 15 has its lens and imager viewing generally rearward along the side of the vehicle for capturing image data representative of at least a blind spot region along the side of and rearward of the vehicle.

The camera device is extendable to provide an enhanced rearward field of view. The camera device may include an electrically powered motor(s) or actuator(s) that imparts movement or shape-changing of the camera device relative to the vehicle body portion, such as in response to a user input or other triggering event. Optionally, the camera device may extend anytime the vehicle is driven, such as responsive to the vehicle transmission being shifted into forward or reverse gear. Although described above as facing rearward when extended, the camera device may be configured such that, when in its extended position, the camera is directed generally downward toward the ground along the side (or rear or front) of the vehicle, such as for a surround view camera system or vision system or the like.

Optionally, a ground illuminator may be activated when the housing or camera device or wing is extended. Optionally, the end position or extended position does not have to be a fixed point. For example, the housing structure can have an intermediate position that is movable or selectable responsive to an input by the driver of the vehicle.

Thus, the camera device of the present invention provides a camera device or wing that extends out from the vehicle and that operates in two primary states, a deployed/extended state and an undeployed/flush state. When the camera device is retracted, the system achieves better vehicle aerodynamics, and is able to protect the camera(s) from damage while they are stowed within the vehicle. Also, the camera device, when retracted, provides a more aesthetic vehicle exterior and may provide the ability to clean the camera lens upon making the wing flush. When the camera device is extended, the device provides access to hidden camera(s)(camera monitoring systems, 360 degree or surround view cameras, autonomous or self-driving vehicle cameras and/or non-imaging sensors), ground illuminators, maneuvering lighting/cameras. The extended position provides a better vantage point for the camera(s) on the device by extending out from the vehicle body. The camera device may optionally have one or more intermediate positions that fall between the primary states and is adjustable to either the partially extended position or the fully extended position, which allows for camera aiming/positioning.

Thus, the camera device has different movements and may provide vertical or horizontal views, depending on the application. The device may provide for moving the camera in different directions, such as rearward, forward, up or down, and may also move into the vehicle body portion. The device may include one or more actuators to selectively increase or alter the field of view of the camera (such as responsive to a user input actuated by the driver of the vehicle). The device may provide a manual override for extension or retraction, where the manual override may be a part of the device or it may be a lever/button in the vehicle cabin that provides a mechanism to force the structure to deploy when it is stuck or unpowered. The extending camera wing may be mounted in various locations, such as at a front or rear vehicle fender or at a side or rear vehicle door or the like. The camera devices include a camera (such as for a CMS or surround view system or the like) and may also include an illumination source (such as for illuminating the ground at the side of the vehicle and/or for illuminating at least a portion of the field of view of the camera) and may also include an indicator or the like or other electronic accessory.

The cameras may comprise any suitable imaging sensor or camera, such as a pixelated imaging array or the like, such as a CMOS imaging array sensor, a CCD sensor or other sensors or the like, such as a camera or sensor of the types disclosed in commonly assigned, U.S. Pat. Nos. 7,965,336; 5,550,677; 5,760,962; 6,097,023 and 5,796,094, which are hereby incorporated herein by reference in their entireties.

Optionally, the camera may have a wide angle field of view at the side of the vehicle and/or may have an adjustable field of view and/or may capture images for use in other vision systems, such as for use in a top-down view or bird's-eye view vision system of the vehicle or a surround view vision system at the vehicle, such as by utilizing aspects of the vision systems described in U.S. Pat. Nos. 10,071,687; 9,900,522; 9,762,880; 9,126,525 and/or 9,041,806, and/or U.S. Publication Nos. US-2015-0022664 and/or US-2012-0162427, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular imaging system comprising:
an electronic control unit (ECU) disposed at a vehicle equipped with the vehicular imaging system, wherein the ECU comprises electronic circuitry and associated software;
a camera device disposed at a body portion of the vehicle, wherein the camera device comprises a structure that supports a camera;
wherein the structure is movable relative to the body portion of the vehicle between a stowed position, where the structure and camera are within the body portion with an outer surface of the structure being co-planar with an outer surface of the body portion, and an extended position, where the structure and camera are extended outward from the body portion so that the camera is positioned outboard of the outer surface of the body portion and viewing exterior of the vehicle;
wherein the structure comprises a plurality of individually movable elements that are disposed adjacent one another and that cooperate to form the outer surface;
wherein the plurality of individually movable elements, when moved relative to the body portion of the vehicle, cooperate to move the structure between the stowed position and the extended position;
wherein individual elements of the plurality of individually movable elements are individually moved relative to the body portion of the vehicle and relative to one another to adjust a contour of the outer surface of the structure;
wherein the camera, with the structure in the extended position, captures image data and provides captured image data to the ECU; and
wherein the ECU processes the provided image data for (i) display of video images derived from video image data captured by the camera and provided to the ECU and/or (ii) detection of objects viewed by the camera.

2. The vehicular imaging system of claim 1, wherein the plurality of individually movable elements comprise a plurality of cube-shaped elements.

3. The vehicular imaging system of claim 1, wherein the plurality of individually movable elements comprise a plurality of pyramid-shaped elements.

4. The vehicular imaging system of claim 1, wherein the plurality of individually movable elements are joined to others of the plurality of individually movable elements via at least one flexible element that flexes to move the structure between the extended position and the stowed position.

5. The vehicular imaging system of claim 4, wherein the flexible element flexes toward a more curved state to move the structure toward the extended position and the flexible element is straightened toward a less-curved state to move the structure toward the stowed position.

6. The vehicular imaging system of claim 1, wherein the plurality of individually movable elements are movable to adjust a shape of the structure when the structure is in the extended position.

7. The vehicular imaging system of claim 1, wherein the plurality of individually movable elements are movable to adjust a position of the camera and a viewing angle of the camera when the structure is in the extended position.

8. The vehicular imaging system of claim 7, wherein, when the structure is in the extended position, a lens of the camera is exposed at an outermost surface of the structure, and wherein the outermost surface of the structure is conformable to the plurality of individually movable elements.

9. The vehicular imaging system of claim 1, wherein the plurality of individually movable elements are joined together via a flexible fabric.

10. The vehicular imaging system of claim 1, wherein outer surfaces of the plurality of individually movable elements cooperate to form a curved surface when the structure is in the extended position.

11. The vehicular imaging system of claim 1, wherein a flexible material is disposed across outer surfaces of the plurality of individually movable elements to provide the outer surface of the structure, and wherein the flexible material is conformable to the plurality of individually movable elements.

12. The vehicular imaging system of claim 1, wherein at least some of the plurality of individually movable elements are illuminated by one or more light sources of the camera device.

13. The vehicular imaging system of claim 12, wherein the light sources are operable to provide a customizable pattern that varies in color and/or brightness of the light emitted by the respective light sources.

14. The vehicular imaging system of claim 1, wherein the camera comprises a camera of a camera monitoring system (CMS) of the vehicle.

15. The vehicular imaging system of claim 1, comprising a video display screen disposed in the vehicle, wherein the video display screen is operable to display video images derived from video image data captured by the camera and provided by the ECU.

16. The vehicular imaging system of claim 15, wherein the video display screen comprises a video mirror display screen disposed at an interior rearview mirror assembly of the vehicle.

17. A vehicular imaging system comprising:
an electronic control unit (ECU) disposed at a vehicle equipped with the vehicular imaging system, wherein the ECU comprises electronic circuitry and associated software;
a camera device disposed at a body portion of the vehicle, wherein the camera device comprises a structure that supports a camera, and wherein the camera comprises a camera of a camera monitoring system (CMS) of the vehicle;
wherein the structure is movable relative to the body portion of the vehicle between a stowed position, where the structure and camera are within the body portion with an outer surface of the structure being co-planar with an outer surface of the body portion, and an extended position, where the structure and camera are extended outward from the body portion so that the camera is positioned outboard of the outer surface of the body portion and viewing exterior of the vehicle;
wherein the structure comprises a plurality of individually movable elements that are disposed adjacent one another and that cooperate to form the outer surface;
wherein the plurality of individually movable elements, when moved relative to the body portion of the vehicle, cooperate to move the structure between the stowed position and the extended position;
wherein individual elements of the plurality of individually movable elements are individually moved relative to the body portion of the vehicle and relative to one another to adjust a contour of the outer surface of the structure;
wherein the plurality of individually movable elements are movable to adjust a shape of the structure when the structure is in the extended position;
wherein the plurality of individually movable elements are movable to adjust a position of the camera and a viewing angle of the camera when the structure is in the extended position;
wherein the camera, with the structure in the extended position, captures image data and provides captured image data to the ECU; and
wherein the ECU processes the provided image data for (i) display of video images derived from video image data captured by the camera and provided to the ECU and/or (ii) detection of objects viewed by the camera.

18. The vehicular imaging system of claim 17, wherein the plurality of individually movable elements are joined to others of the plurality of individually movable elements via at least one flexible element that flexes to move the structure between the extended position and the stowed position, and wherein the flexible element flexes toward a more curved state to move the structure toward the extended position and the flexible element is straightened toward a less-curved state to move the structure toward the stowed position.

19. The vehicular imaging system of claim 17, wherein outer surfaces of the plurality of individually movable elements cooperate to form a curved surface when the structure is in the extended position.

20. The vehicular imaging system of claim 17, wherein a flexible material is disposed across outer surfaces of the plurality of individually movable elements to provide the outer surface of the structure, and wherein the flexible material is conformable to the plurality of individually movable elements.

21. A vehicular imaging system comprising:
an electronic control unit (ECU) disposed at a vehicle equipped with the vehicular imaging system, wherein the ECU comprises electronic circuitry and associated software;
a camera device disposed at a body portion of the vehicle, wherein the camera device comprises a structure that supports a camera, and wherein the camera comprises a camera of a camera monitoring system (CMS) of the vehicle;
wherein the structure is movable relative to the body portion of the vehicle between a stowed position, where the structure and camera are within the body portion with an outer surface of the structure being co-planar with an outer surface of the body portion, and an extended position, where the structure and camera are extended outward from the body portion so that the camera is positioned outboard of the outer surface of the body portion and viewing exterior of the vehicle;
wherein the structure comprises a plurality of individually movable elements that are disposed adjacent one another and that cooperate to form the outer surface;
wherein the plurality of individually movable elements, when moved relative to the body portion of the vehicle, cooperate to move the structure between the stowed position and the extended position;
wherein individual elements of the plurality of individually movable elements are individually moved relative to the body portion of the vehicle and relative to one another to adjust a contour of the outer surface of the structure;
wherein outer surfaces of the plurality of individually movable elements cooperate to form a curved surface when the structure is in the extended position;
wherein the plurality of individually movable elements are joined to others of the plurality of individually movable elements via at least one flexible element that flexes to move the structure between the extended position and the stowed position;

wherein the flexible element flexes toward a more curved state to move the structure toward the extended position and the flexible element is straightened toward a less-curved state to move the structure toward the stowed position;

wherein the camera, with the structure in the extended position, captures image data and provides captured image data to the ECU; and wherein the ECU processes the provided image data for (i) display of video images derived from video image data captured by the camera and provided to the ECU and/or (ii) detection of objects viewed by the camera.

22. The vehicular imaging system of claim 21, wherein the plurality of individually movable elements are movable to adjust a shape of the structure when the structure is in the extended position.

23. The vehicular imaging system of claim 21, wherein the plurality of individually movable elements are joined together via a flexible fabric.

24. The vehicular imaging system of claim 21, wherein a flexible material is disposed across outer surfaces of the plurality of individually movable elements to provide the outer surface of the structure, and wherein the flexible material is conformable to the plurality of individually movable elements.

* * * * *